(12) United States Patent
Kerr

(10) Patent No.: US 7,886,948 B2
(45) Date of Patent: Feb. 15, 2011

(54) HITCH CARRIER DEVICE

(76) Inventor: Ronald Kerr, 155 Prévost, Cookshire, Quebec (CA) J0B 1M0

( * ) Notice: Subject to any disclaimer, the term of this patent is extended or adjusted under 35 U.S.C. 154(b) by 717 days.

(21) Appl. No.: 11/770,815

(22) Filed: Jun. 29, 2007

(65) Prior Publication Data

US 2008/0006666 A1 Jan. 10, 2008

(30) Foreign Application Priority Data

Jul. 5, 2006 (CA) .................................. 2551465

(51) Int. Cl.
*B60R 9/00* (2006.01)
*B66C 1/00* (2006.01)
*B66C 23/44* (2006.01)
*B60P 9/00* (2006.01)

(52) U.S. Cl. ...................... 224/519; 224/525; 224/532; 224/531; 294/81.3; 212/180; 414/462

(58) Field of Classification Search ................ 224/519, 224/525, 532, 531; 294/81.3; 212/180; 414/462; 119/728
See application file for complete search history.

(56) References Cited

U.S. PATENT DOCUMENTS

| | | | | |
|---|---|---|---|---|
| 1,015,239 A * | 1/1912 | Miller | ................ | 119/725 |
| 1,366,178 A * | 1/1921 | Hatch | ................ | 119/725 |
| 3,552,613 A * | 1/1971 | Nye | ................ | 224/406 |
| 3,717,128 A * | 2/1973 | Pearman et al. | ................ | 119/757 |
| 4,489,677 A * | 12/1984 | Handley | ................ | 119/725 |
| 4,550,686 A * | 11/1985 | Munks | ................ | 119/725 |
| 4,597,602 A * | 7/1986 | McGriff | ................ | 294/81.3 |
| 4,626,012 A * | 12/1986 | Weldele | ................ | 294/81.3 |
| 4,767,099 A * | 8/1988 | Munks | ................ | 254/336 |
| 4,831,967 A * | 5/1989 | Anderson | ................ | 119/725 |
| 5,206,896 A * | 4/1993 | Hargest | ................ | 378/180 |
| 5,368,210 A * | 11/1994 | Wotring | ................ | 224/404 |
| 5,469,812 A * | 11/1995 | Burks | ................ | 119/728 |
| 5,749,506 A * | 5/1998 | Davies | ................ | 224/501 |
| 5,842,443 A * | 12/1998 | Steinfort | ................ | 119/726 |
| 5,950,890 A * | 9/1999 | Darby | ................ | 224/402 |
| 6,016,772 A * | 1/2000 | Noyes | ................ | 119/863 |
| 6,070,926 A * | 6/2000 | Hardin | ................ | 296/26.08 |
| 6,276,698 B1 * | 8/2001 | Calandra | ................ | 280/19 |
| 6,477,986 B1 * | 11/2002 | Korjenic | ................ | 119/757 |
| 6,921,007 B1 * | 7/2005 | Guerrant | ................ | 224/519 |
| 7,073,857 B1 * | 7/2006 | Bailey | ................ | 297/217.7 |
| 7,156,246 B2 * | 1/2007 | Sherrod | ................ | 212/180 |
| 7,201,552 B1 * | 4/2007 | Angel et al. | ................ | 414/462 |
| 7,243,966 B1 * | 7/2007 | Sheldon | ................ | 296/26.08 |
| 7,325,356 B2 * | 2/2008 | Norman et al. | ................ | 43/8 |
| D583,518 S * | 12/2008 | Thorner | ................ | D30/151 |

* cited by examiner

*Primary Examiner* — Nathan J Newhouse
*Assistant Examiner* — Lester L Vanterpool
(74) *Attorney, Agent, or Firm* — Ogilvy Renault LLP

(57) ABSTRACT

A hitch carrier device for transporting cargo and particularly, but not exclusively, large game carcasses on a hitch of a road vehicle is described. The carrier device comprises a support structure having a vertical support frame. A hitch connection is provided at a lower end of the vertical support frame. A horizontal harness support frame is secured to an upper end portion of the vertical support frame. A harness of flexible material is detachably secured to the horizontal harness support frame for supporting a cargo to be transported at an elevated position above the hitch behind the road vehicle.

6 Claims, 4 Drawing Sheets

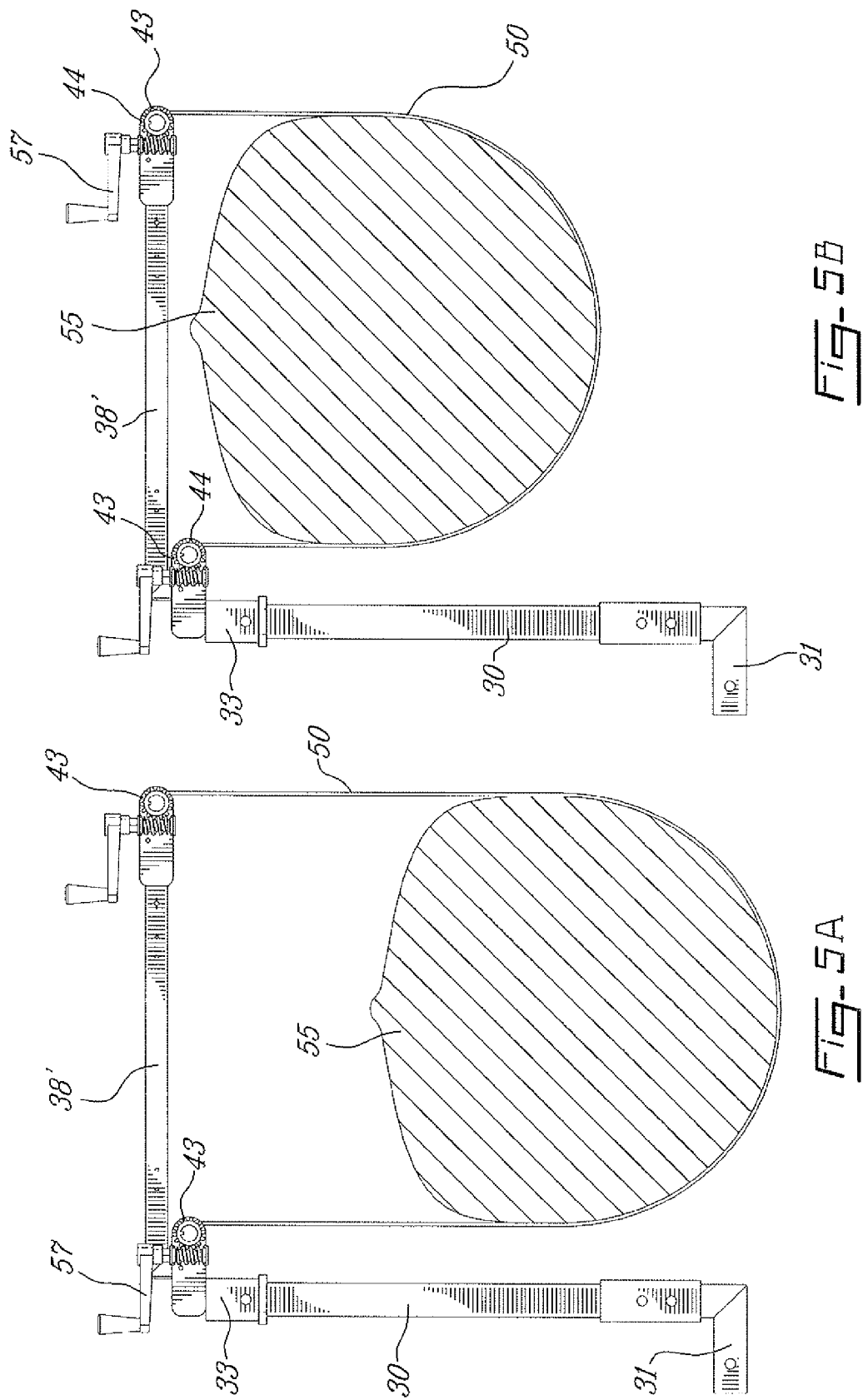

HITCH CARRIER DEVICE

TECHNICAL FIELD

The present invention relates to a hitch carrier device for transporting cargo on a hitch of a road vehicle.

BACKGROUND ART

Various transporting devices are known that are connectable to a hitch of a road vehicle whereby to transport cargo. For Example, such support structures are known whereby to support bicycles or snow skis and other articles behind a road vehicle. The carrier device of the present invention was particularly designed for transporting a cargo which is malleable, such as sports equipment bags and in particular, but not exclusively, to the support of game carcasses.

U.S. Patent Application 2003/0080538 describes a multi-purpose deer hunting cart whereby to support a game carcass. However, that cart was designed whereby to be drawn into the bush where the animal is killed to transport the animal back to a road vehicle. A disadvantage of this type of carrier is that the animal rests on rigid structures and this is damaging to the skin and, of course, to the meat of the carcass. It is not meant to transport an animal by a road vehicle over long distances by connection to a hitch of that vehicle.

SUMMARY OF INVENTION

It is therefore a feature of the present invention to provide a hitch carrier device for transporting cargo, such as game animal carcasses, in a safe manner and wherein the transport device is detachably connectable to the hitch of a road vehicle and does not harm the meat of the carcass.

Another feature of the present invention is to provide a hitch carrier device for transporting cargo such as equipment bags, golf bags, camping gear or any other bulky cargo.

According to the above features, from a broad aspect, the present invention provides a hitch carrier device for transporting cargo on a hitch of a road vehicle. The carrier device comprises a support structure having a vertical support frame. Hitch connecting means is provided at a lower end of the vertical support frame. A horizontal harness support frame is secured to an upper end portion of the vertical support frame. A harness of flexible material is detachably secured to the horizontal harness support frame for supporting a cargo to be transported at an elevated position above the hitch behind the road vehicle. The vertical support frame is comprised by a vertical support post having a horizontal hitch connectinq post at a lower end thereof. A transverse support bar is secured at mid-length thereof to a top end of the vertical support post. A pair of horizontal support arms are connected at a respective end of the transverse support bar and extend in a common direction in parallel relationship to one another. A harness attaching means is provided between a free end of the pair of horizontal support arms and is constituted by a roll bar to which a side portion of the harness is secured. A winch mechanism is secured to an end of the roll bar whereby to wind and unwind a portion of the harness upon the roll bar whereby to lift and lower a load support by the harness.

BRIEF DESCRIPTION OF DRAWINGS

A preferred embodiment of the present invention will now be described with reference to the accompanying drawings in which:

FIGS. 5A and 5B are side views showing the operation of the lifting mechanism to displace the harness from a loading position to a load transport position.

DESCRIPTION OF PREFERRED EMBODIMENTS

Figure 1:
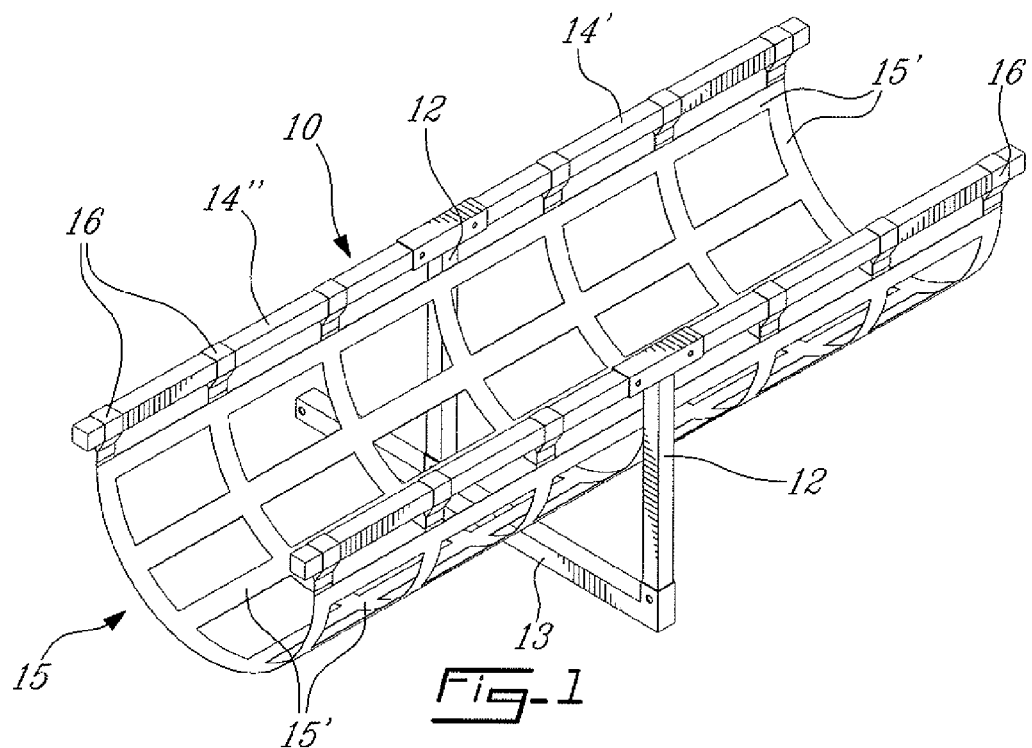
FIG. 1 is a perspective view of a hitch carrier device constructed in accordance with the present invention.
Figure 2:
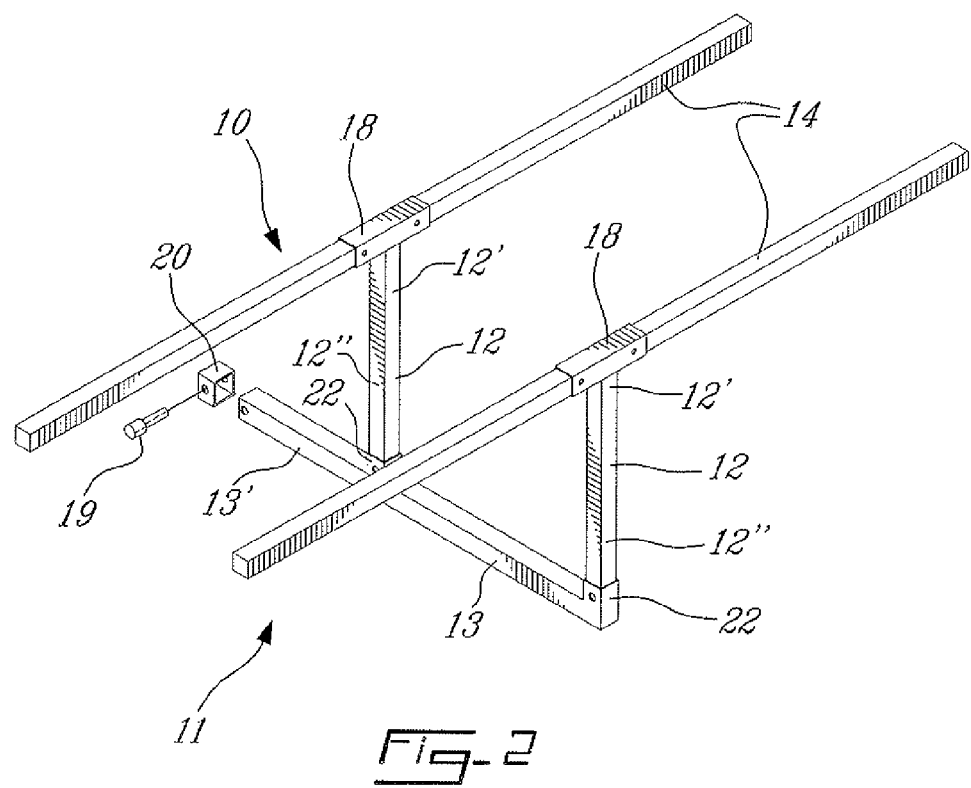
FIG. 2 is a perspective view showing the construction of the support structure of the hitch carrier device.
Figure 3:
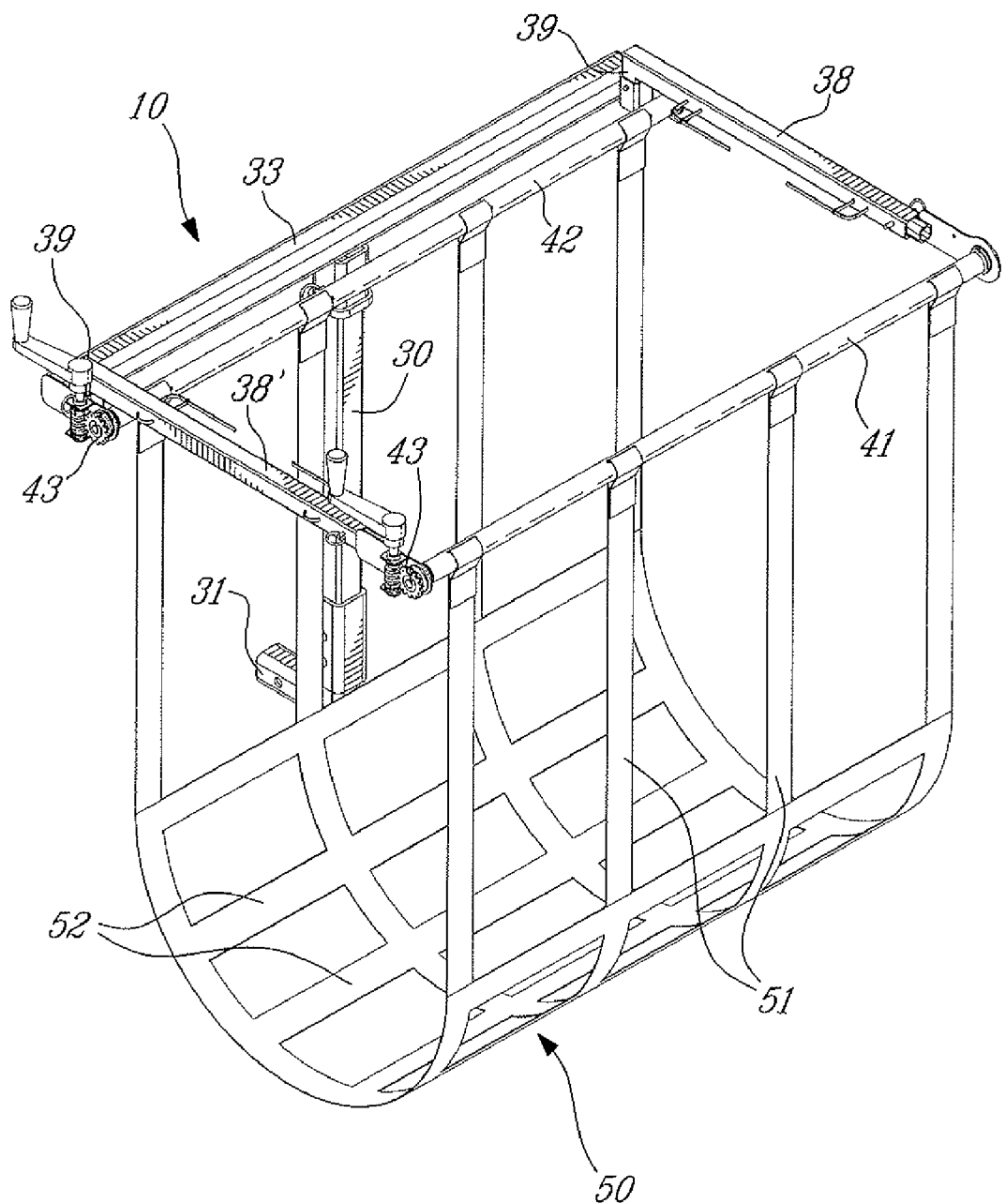
FIG. 3 is a perspective view showing a further embodiment of a hitch carrier device constructed in accordance with the present invention.
Figure 4:
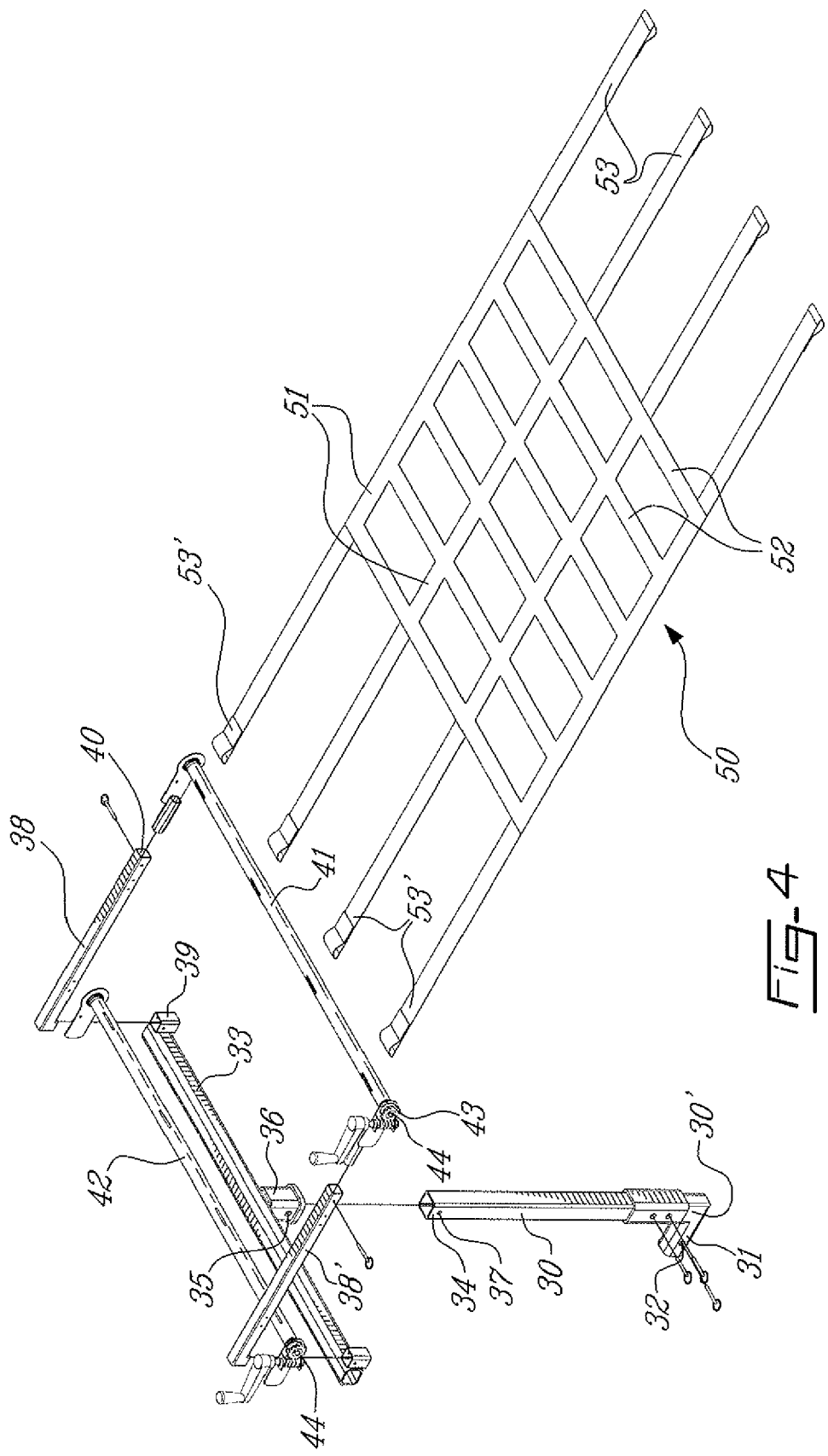
FIG. 4 is an exploded view of the interconnectable parts of the hitch carrier device illustrated in FIG. 4.

Referring now to the drawings and more particularly to FIGS. 1 and 2, there is shown generally at 10 a hitch carrier device constructed in accordance with the present invention whereby to connect to the hitch 20 of a road vehicle, not shown. Such hitches are well known in the art and are comprised by a tubular member which receives a locking pin 19 to secure a hitch attachment rod therein. As hereinshown the hitch carrier device is comprised of a support structure 11 which is comprised of a vertical support frame 12 and a horizontal harness support frame 14 which is secured to the upper end 12' of the vertical support frame 12. The lower end 12" of the vertical support frame is provided with detachable connection means whereby to connect to a lower straight support bar 13 having a hitch connecting end 13'.

As shown in FIG. 1, a harness 15 of flexible material, herein flexible canvas straps 15' interconnected in transverse relationship, is detachably secured to the horizontal harness support frame members 14. This harness is provided with loop ends 16 which are slid over opposed free ends 14' and 14" of the horizontal support frame members 14. Accordingly, the harness 15 is a flexible harness constituted by a flat wide strap whereby to support game carcasses without damaging the skin and meat of the carcass as the harness conforms to the shape of the animal carcass and provides a smooth support structure. Of course the animal carcass would be tied down to the harness straps 15' by further strapping means.

As hereinshown the vertical support frame is comprised of a pair of vertical support posts 12 secured at a lower end in spaced-apart relationship to the straight support bar 13 which is provided with the hitch connector 13' at a free end thereof. The horizontal harness support frame 14 is comprised of two straight horizontal support bars formed by bar sections 17 and 17' interconnected together by a connector 18. Also the vertical posts 2 are interconnected to the horizontal straight support frame 13 by connectors 22. Accordingly, the horizontal harness support frame is a straight horizontal support bar secured at mid-length thereof to a top end of each of the vertical support posts 12 and extends transversely to the straight support bar 13 whereby the horizontal support bars 14 are spaced apart in spaced, parallel relationship. The harness 15, as shown in FIG. 1, depends from between these horizontal support bars.

Although as illustrated in FIG. 1 the harness is constructed of strapping, it is also conceivable that the harness can be in the form of a canvas bag and the harness can be open-ended, as shown in FIG. 1, or have closed strap ends as is obvious to a person skilled in the art. Further, although the hitch carrier device of the present invention was conceived for the carrying of game carcasses, it is intended that such carrier can be used to carry all sorts of cargo such as sport bags, golf bags, camping gear, coolers or any bulky cargo and particularly cargo which is malleable. The harness or hand or canvass bag may also be constructed of weather-proof material.

With reference now to FIGS. 3 to 5B, there will be described a further embodiment of the hitch carrier device of the present invention. As hereinshown the vertical support frame is constituted by a vertical support post 30 which is provide with a horizontal connecting post 31 at a lower end 30' thereof. The horizontal hitch connecting post has a hitch connector 32 at a free end thereof. A transverse support bar 33 is secured at mid-length thereof to a top end 34 of the vertical support post 30 by aligning the holes 35 in the vertical connector 36 with the holes 37 at the top end of the vertical post 30 and placing a lock pin therethrough as is obvious to a person skilled in the art. A pair of horizontal support arms 38 and 38' are each connected to a respective end connector 39 of the transverse support bar 33 and extend in a common rearward direction in parallel spaced relationship to one another. Harness attaching means is provided between a free end 40 and 40' of each of the horizontal support arms 38 and 38' whereby to detachably secure the harness attaching means which is herein constituted by a roll bar 41. As hereinshown a further roll bar 42 is connected adjacent the transverse support bar 33 under the pair of horizontal support arms 38. Each of these roll bars are provided with a well known winch mechanism 43, respectively, whereby to cause rotation of the roll bars. The winch mechanism 43 is constituted by a worm gear and sprocket drive coupling 44 whereby to arrest the bar against counter-rotation when lifting a load on the harness 50 secured thereto. A wench handle 57 is coupled to the worm gear to rotate same to impart rotation to the roll bar 41.

As hereinshown the harness 50 is comprised of transverse interconnected straps 51 and 52 and they are provided with free end portions 53 which interconnect, by suitable means (not shown herein, but obvious to a person skilled in the art) to a respective one of the roll bars 41 and 42. Of course, the end 53' may be connected to a stationary bar 42 or to the transverse support bar 33 while the other end 53 of the harness is connected to the roll bar 41 to cause the harness to be lowered and raised, as illustrated in FIGS. 5A and 5B. However, this would cause displacement of the load during lifting as it would cause the load to tend to rotate within the harness, but it may be suitable for carrying certain loads wherein this action would not be damaging to the load.

Although not shown, the support frame may be provided with anti-sway tie-down ropes or wires, respectively connected to the pair of horizontal support arms 38 and 38' whereby to prevent swaying of the vertical support frame when carrying a heavy load, particularly over bumpy roads or terrain.

As shown in FIGS. 5A and 5B, the harness 50 is shown in FIG. 5A in a lowered position whereby a load 55 may be positioned into the harness 50 when lowered against a ground surface 56. This provides for ease of loading of heavy loads such as game animal carcasses. Once the load 55 is placed in the harness then both winches 43 are actuated whereby to raise the load with the ratchets 44 preventing the weight of the load to unwind the harness from its respective roll bars. Once the load is lifted, as shown in FIG. 5B, it is ready for transport. In order to unload the load, it is only necessary to disengage the ratchets 44 and to cause rotation of the roll bars by rotating the winch handles 57 in a counter-clockwise direction.

It is within the ambit of the present invention to cover any obvious modifications of the preferred embodiment described herein, provided such examples fall within the scope of the appended claims. It is also pointed out that the hitch carrier device of the present invention, although constructed of detachable parts, may be constructed as a permanent rigid structure. It is also pointed out that the detachable parts are intended to be packaged or stored in a case such as a nylon bag or a plastic tool box which is conveniently stored in the trunk of a motor vehicle and which is compact in size. It is also pointed out that by using a harness formed of straps it provides ventilation to an animal carcass carried thereby whereby to maintain the meat fresh and preventing contamination.

I claim:

1. A hitch carrier device for transporting cargo on a hitch of a road vehicle, said carrier device comprising a support structure having a vertical support post, a horizontal hitch connecting post at a lower end of said vertical support post, a horizontal harness support frame secured to an upper end portion of said vertical support post, a harness of flexible material detachably secured to said horizontal harness support frame for supporting a cargo to be transported at an elevated position above said hitch behind said road vehicle, a transverse support bar secured at mid-length thereof to a top end of said vertical support post, said horizontal harness support frame having a pair of horizontal support arms, each horizontal support arm being connected at a respective end of said transverse support bar and extending in a common direction in parallel relationship to one another, harness attaching means between a free end of said pair of horizontal support arms, said harness attaching means being constituted by a roll bar to which a side portion of said harness is secured, and a winch mechanism secured to an end of said roll bar whereby to wind and unwind a portion of said harness upon said roll bar whereby to lift and lower a load supported by said harness.

2. A hitch carrier device as claimed in claim 1 wherein said cargo is constituted by one or more game carcasses.

3. A hitch carrier device as claimed in claim 2 wherein said harness is a strap harness which is detachably securable to said horizontal harness support frame.

4. A hitch carrier device as claimed in claim 1 wherein said harness is one of a canvas bag, an open-end strap harness, or a closed end strap harness.

5. A hitch carrier device as claimed in claim 1 wherein a further roll bar and further winch mechanism is secured adjacent said transverse support bar under said pair of horizontal support arms.

6. A hitch carrier device as claimed in claim 1 wherein said support structure is constituted by detachably securable rigid bars, said harness being constructed of flexible and waterproof textile material.

* * * * *